(12) United States Patent
Lee et al.

(10) Patent No.: US 9,154,684 B2
(45) Date of Patent: Oct. 6, 2015

(54) METHOD FOR PERFORMING OUT-FOCUS USING DEPTH INFORMATION AND CAMERA USING THE SAME

(75) Inventors: Jin-Kyung Lee, Suwon-si (KR);
Tae-Kyung Kim, Seoul (KR);
Taek-Seong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 882 days.

(21) Appl. No.: 13/004,363

(22) Filed: Jan. 11, 2011

(65) Prior Publication Data

US 2011/0169921 A1    Jul. 14, 2011

(30) Foreign Application Priority Data

Jan. 12, 2010    (KR) .................. 10-2010-0002617

(51) Int. Cl.
*H04N 7/18* (2006.01)
*H04N 5/232* (2006.01)
*H04N 13/02* (2006.01)

(52) U.S. Cl.
CPC ....... *H04N 5/23212* (2013.01); *H04N 13/0239* (2013.01); *H04N 13/0246* (2013.01)

(58) Field of Classification Search
CPC .......... H04N 5/23212; H04N 13/0246; H04N 13/0239
USPC .................................................... 348/46, 47
See application file for complete search history.

(56) References Cited

U.S. PATENT DOCUMENTS

| | | | | |
|---|---|---|---|---|
| 5,781,198 | A * | 7/1998 | Korn | 345/634 |
| 6,570,566 | B1 * | 5/2003 | Yoshigahara | 345/427 |
| 8,243,123 | B1 * | 8/2012 | Geshwind et al. | 348/42 |
| 8,330,796 | B2 * | 12/2012 | Schmidt et al. | 348/36 |
| 2009/0153649 | A1 * | 6/2009 | Hirooka et al. | 348/47 |
| 2010/0289904 | A1 * | 11/2010 | Zhang et al. | 348/207.1 |
| 2011/0075257 | A1 * | 3/2011 | Hua et al. | 359/464 |
| 2011/0080466 | A1 * | 4/2011 | Kask et al. | 348/43 |

FOREIGN PATENT DOCUMENTS

| | | |
|---|---|---|
| KR | 1020060124176 | 12/2006 |
| KR | 10-2007-0097638 | 10/2007 |
| KR | 10-0801088 | 1/2008 |

OTHER PUBLICATIONS

English language abstract of KR 10-2007-0097638, published Oct. 5, 2007.
English language abstract of KR 10-0801088, published Jan. 29, 2008.

* cited by examiner

*Primary Examiner* — Tung Vo
(74) *Attorney, Agent, or Firm* — The Farrell Law Firm, P.C.

(57) ABSTRACT

A method for performing out-focus of camera having a first lens and a second lens, comprising: photographing a first image with the first lens and photographing a second image with the second lens; extracting depth information of the photographed first image and second image; and performing out-focus on the first image or the second image using the extracted depth information.

14 Claims, 10 Drawing Sheets

FIG. 5A
FIG. 5B
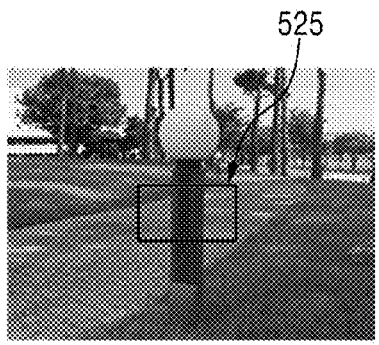

METHOD FOR PERFORMING OUT-FOCUS USING DEPTH INFORMATION AND CAMERA USING THE SAME

CROSS-REFERENCE TO RELATED APPLICATIONS

This application claims priority from Korean Patent Application No. 10-2010-0002617, filed on Jan. 12, 2010, in the Korean Intellectual Property Office, the disclosure of which is incorporated herein by reference in its entirety.

BACKGROUND OF THE INVENTION

"Out-focus" is a photographing technique which highlights a main object concerned by positioning the main object within the depth of field and positioning the background out of the depth of filed to make the background blurred. This can be explained by a geometric optical method using a circle of confusion (COC).

The size k of the circle of confusion can be expressed by Equation (1) below, where N denotes an f-number, f denotes a focal length, u denotes a distance from a camera to a focus surface, and ud denotes a background distance.

$$k = \frac{1}{N} \frac{f^2}{u-f} \frac{|u_d - u|}{u_d} \quad (1)$$

In Equation (1), the size k of the circle of confusion differs in accordance with f number and the focal length of a camera even with respect to the same values of u and ud. Also, as can be understood from Equation (1), the size k of the circle of confusion is inversely proportional to the f-number, and in proportion to a square of f.

In general, as the ratio of the circle of confusion to the background increases, the out focus effect becomes more pronounced, whereas as the ratio of the circle of confusion to the background decreases, the out-focus effect becomes less pronounced.

A method of implementing the out-focus effect in the related art is performed mainly using a DSLR (Digital Single-Lens Reflex) camera. The DSLR camera is a lens exchange type camera. Since the DSLR camera can make the f-number small and make the focal length long, the size of the circle of confusion and the ratio of the circle of confusion to the background can be increased, and thus the out-focus effect can be well presented.

However, in a DSC (Digital Still Camera) or a phone camera, the focal length is generally short and the f-number is generally large, and it may not be possible to properly present the out-focus effect. In comparison to the DSLR camera, the out-focus effect of a DSC or phone camera may be tens to several hundreds of times lower than that of the DSLR camera.

SUMMARY OF THE INVENTION

According to one embodiment of the present invention, a method for performing out focus of a camera having a first lens and a second lens includes photographing a first image with the first lens and photographing a second image with the second lens of the same scene; extracting depth information of the photographed first image and second image using the photographed first image and second image; and performing the out-focus with respect to the first image or the second image using the extracted depth information.

BRIEF DESCRIPTION OF THE DRAWINGS

FIGS. 5A and 5B are two photographs taken by a first lens unit and a second lens unit having optical zoom effects of different magnifications according to an embodiment of the present invention.

DETAILED DESCRIPTION OF EXEMPLARY EMBODIMENTS

Figure 1:
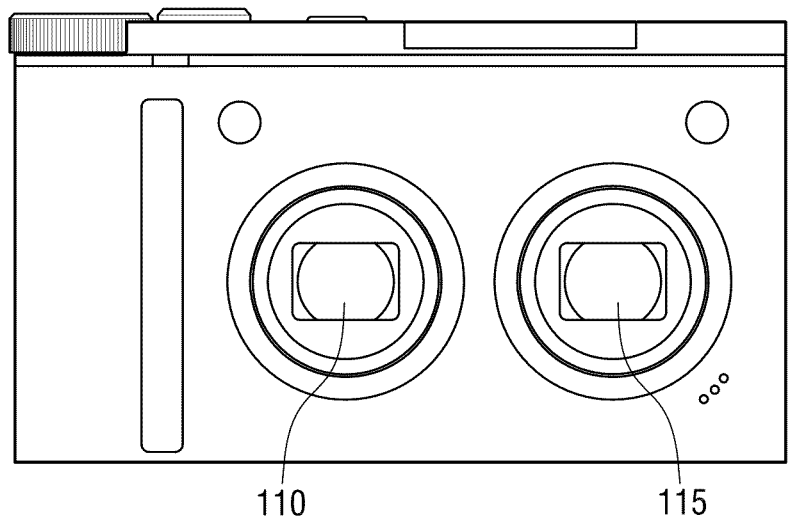
FIG. 1 is a view illustrating a stereo camera according to an embodiment of the present invention.

Certain embodiments of the present invention will now be described in greater detail with reference to the accompanying drawings.

In the following description, same drawing reference numerals are used for the same elements even in different drawings. While the embodiments are described with detailed construction and elements to assist in a comprehensive understanding of the various applications and advantages of the embodiments, it should be apparent that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

FIG. 1 is a view illustrating a stereo camera 100 according to an embodiment of the present invention. As illustrated in FIG. 1, a stereo camera 100 according to an embodiment of the present invention may have at least two lenses 110 and 115 and at least two image sensors (not illustrated). A first image and a second image of the same scene may be acquired through two different lenses 110 and 115.

In some embodiments, the two different acquired images may be images having different resolutions or images acquired by optical zoom having different magnifications. For example, the first image may be a high-resolution image having a resolution equal to or higher than 10 megapixels, and the second image may be a low-resolution image having a resolution of about 1, 3, or 5 megapixels. FIGS. 5A and 5B show photographs taken by the first lens unit 110 and the second lens unit 115 having optical zoom effects of different magnifications. FIG. 5A is a photograph taken by the first lens unit, i.e. by a lens having a high-magnification optical zoom function of ×5. FIG. 5B is a photograph taken by the second lens unit, i.e. by a lens having a low-magnification optical zoom function of ×1.

In another example, the first image may be an image acquired by a high magnification optical zoom that is equal to or higher than ×5 optical zoom, and the second image may be an image acquired by a low-magnification optical zoom, such as no optical zoom, ×2 optical zoom, or another magnification less than the first image.

Figure 4A:
FIGS. 4A and 4B are two photographs having different resolutions acquired by a first image sensor and a second image sensor according to an embodiment of the present invention.
Figure 4B:
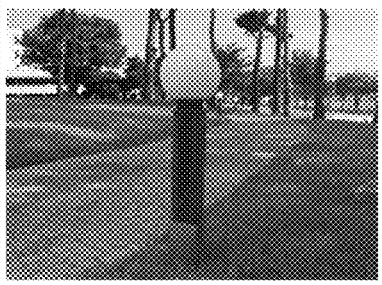

FIGS. 4A and 4B show photographs having different resolutions picked up by the first image sensor 120 and the second image sensor 125. FIG. 4A shows an image picked up by the first image sensor 120 with a resolution of 10 megapixels. FIG. 4B shows an image picked up by the second image sensor 125 with a resolution of 5 megapixels.

The stereo camera 100 may extract depth information of a photographed scene using the two images of the same scene. Using the extracted depth information, the stereo camera 100 may perform out-focus with respect to the first image or the second image. The details of the process of extracting the depth information will be described below with reference to FIG. 3.

Figure 2:
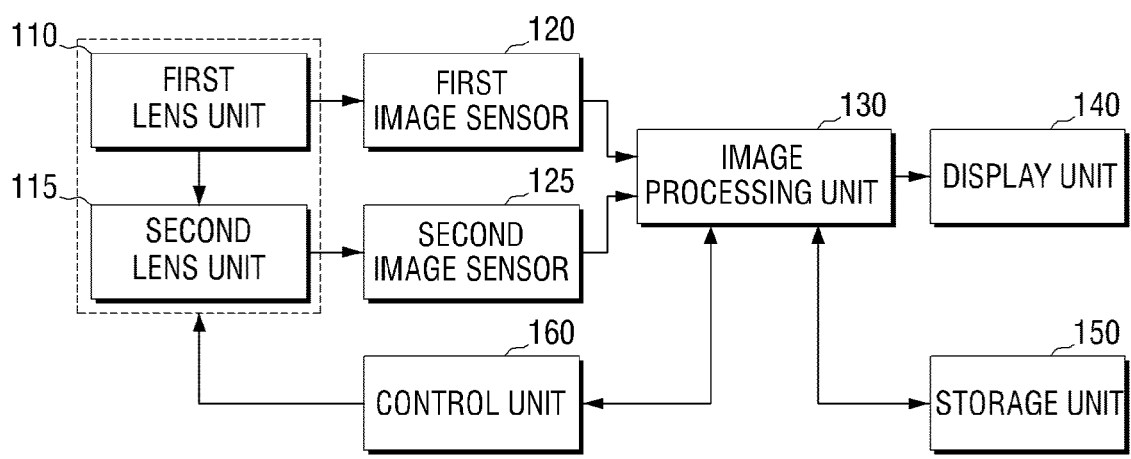
FIG. 2 is a block diagram illustrating the configuration of a stereo camera according to an embodiment of the present invention.

FIG. 2 is a block diagram illustrating the configuration of a stereo camera 100 according to an embodiment of the present invention. As illustrated in FIG. 2, the stereo camera 100 may include a first lens unit 110, a second lens unit 115, a first image sensor 120, a second image sensor 125, an image processing unit 130, a display unit 140, a storage unit 150, and/or a control unit 160.

The first lens unit 110 and the second lens unit 115 may gather light from an object and form images on regions of the first image sensor 120 and the second image sensor 125. The first image sensor 120 and the second image sensor 125 may perform photoelectric conversion of light from the first lens unit 110 and the second lens unit 115 into electric signals. An image processing unit 130 may process the first image and the second image input from the first image sensor 120 and the second image sensor 125, respectively, and may transmit an image signal obtained by processing the images to the display unit 140. The image processing unit 130 may also extract depth information from the first image and the second image, and may perform the out-focus using the extracted depth information. The depth information may be incorporated into a depth map that may include depth information of respective pixels of the first image and the second image.

To extract depth information in embodiments of the invention with lenses of different magnification, the image processing unit 130 may crop a region that corresponds to the first image among the whole region of the second image photographed by a low-magnification optical zoom to match the first image to the cropped portion of the second image. Here, the term "crop" means cutting of a predetermined region of an image.

After cropping the second image, in embodiments of the invention with image sensors of different resolution, the image processing unit 130 may perform down sampling to match the first image having a high resolution to the resolution of the second image having a low resolution.

The image processing unit 130 may then correct the first image and the second image to match the first down-sampled image to the second image. Matching of the first image to the second image may involve matching of focuses, exposure conditions, white balances, epipolar lines, and the like, of the first image and the second image. The image processing unit 130 may process the first image and the second image, and may rotate and move the first image and the second image so that the focuses, exposure conditions, white balances, and the like, of the first image and the second image substantially coincide with each other.

After correcting the first image and the second image, the image processing unit 130 may extract the depth map using the matched first image and the second image. A stereo matching method may be used to extract the depth map. A stereo matching method may be a method that calculates a depth value by detecting the locations of corresponding points in different images and determining an amount of movement of the corresponding points in the image. The image processing unit 130 may generate a depth map by gathering the depth values of some or all of the pixels. Then, the image processing unit 130 may perform up-sampling of the extracted depth map and may perform out-focus using the up-sampled depth map.

A method of extracting depth information using the first image and the second image according to an embodiment of the invention will be described in detail with reference to FIG. 3. The display unit 140 may display an image received from the image processing unit 130. A user can confirm the photographed image by confirming the image displayed on the display unit 140. The storage unit 150 may store the images photographed by the first image sensor 120 and the second image sensor 125 in a compressed form. The storage unit 160 may be a nonvolatile memory, a hard disc, or the like. The control unit 160 may receive a user command based on a user's input to a manipulation unit (not illustrated), and may control the operation of the stereo camera 100 in accordance with the user command. The control unit 160 may control the image processing unit 130 to perform an auto focusing, auto exposure, auto white balancing, and the like, of the stereo camera 100. The control unit 160 may also extract depth information using the first image and the second image, and may control the image processing unit 130 so that out focus is performed with respect to the first image and the second image using the extracted depth information.

Hereinafter, with reference to FIGS. 3 and 6A to 6E, the out-focusing method using the depth information according to an embodiment of the invention will be described.

Figure 3:
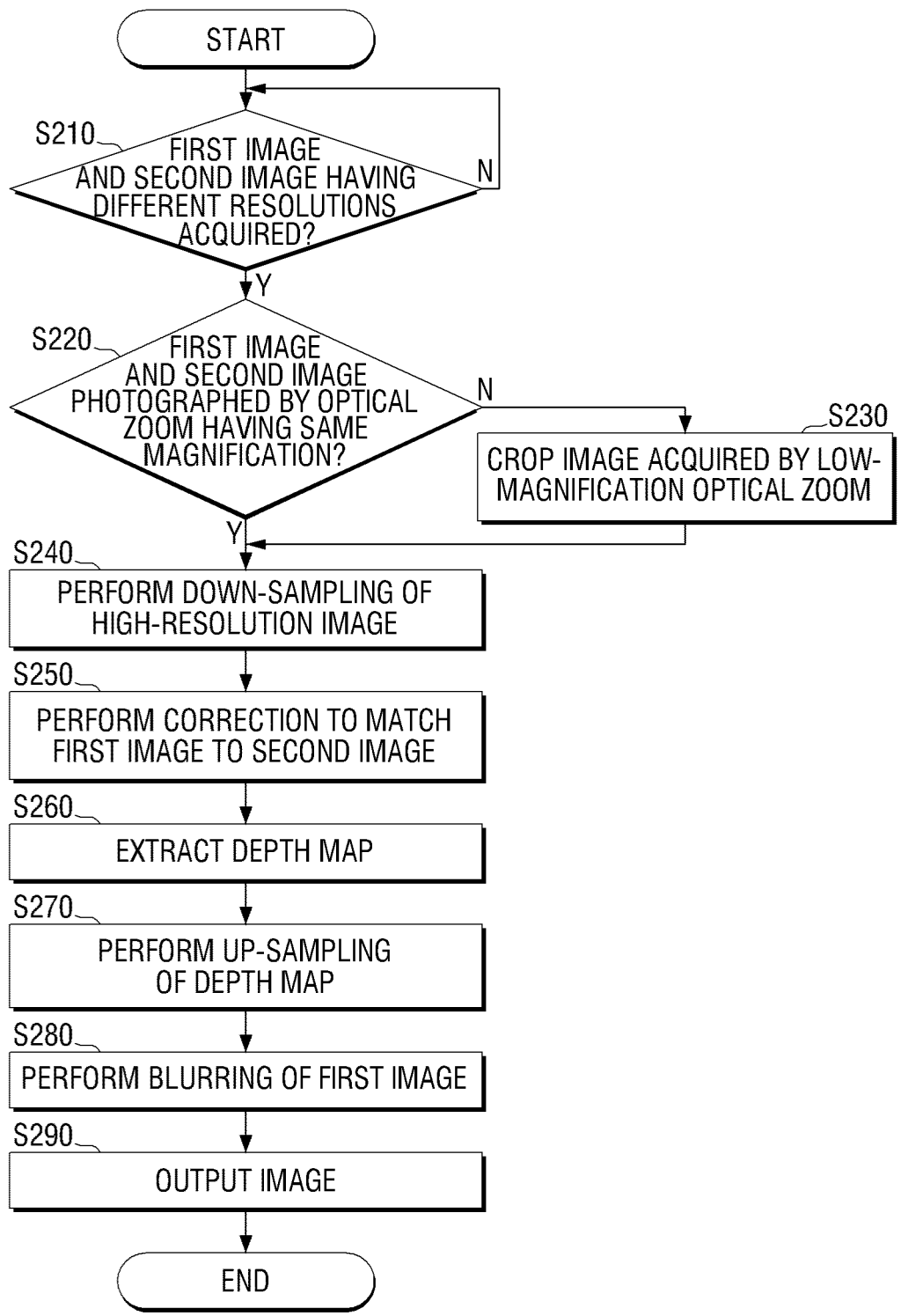
FIG. 3 is a flowchart illustrating a method for performing out-focus using depth information according to an embodiment of the present invention.

FIG. 3 is a flowchart illustrating a method for performing the out-focus using the depth information according to an embodiment of the present invention. The stereo camera 100 may determine whether the first image and the second image having different resolutions have been photographed through the first image sensor and the second image sensor (S210). If the first image and the second image having different resolutions have been photographed (S210-Y), the stereo camera 100 may determine whether the first image and the second image have been photographed by optical zoom having different magnifications (S220).

If the first image and the second image are photographed by the optical zoom having the same magnification (S220-Y), the stereo camera 100 may perform down-sampling of the first image having high resolution to the resolution level of the second image having low resolution, which may enable extracting the depth map by the stereo matching method (S240). For example, in the case where a high-resolution image of 10 megapixels, FIG. 4A, and a low-resolution image of 5 megapixels, FIG. 4B, are photographed, the stereo camera 100 may perform down-sampling of the high-resolution image to match the resolution of the low-resolution image. Since the resolution of the high-resolution image is twice higher than the resolution of the low-resolution image in this example, the resolution of the high-resolution image may be down-sampled by ½.

The stereo camera 100 may match the first image to the second image to extract the depth map using the first down-sampled image and the second image. The stereo camera 100 may correct the first image and the second image to match the first image to the second image (S250). As described above, matching of the first image to the second image may include rotating and moving of the first image or the second image to match the epipolar lines of the first image and the second image in addition to the matching of focuses, exposure conditions, white balances, and the like, of the first image and the second image.

Figure 6A:
FIGS. 6A to 6E are photographs showing a process of performing an out-focus effect using depth information according to an embodiment of the present invention.
Figure 6B:
Figure 6C:
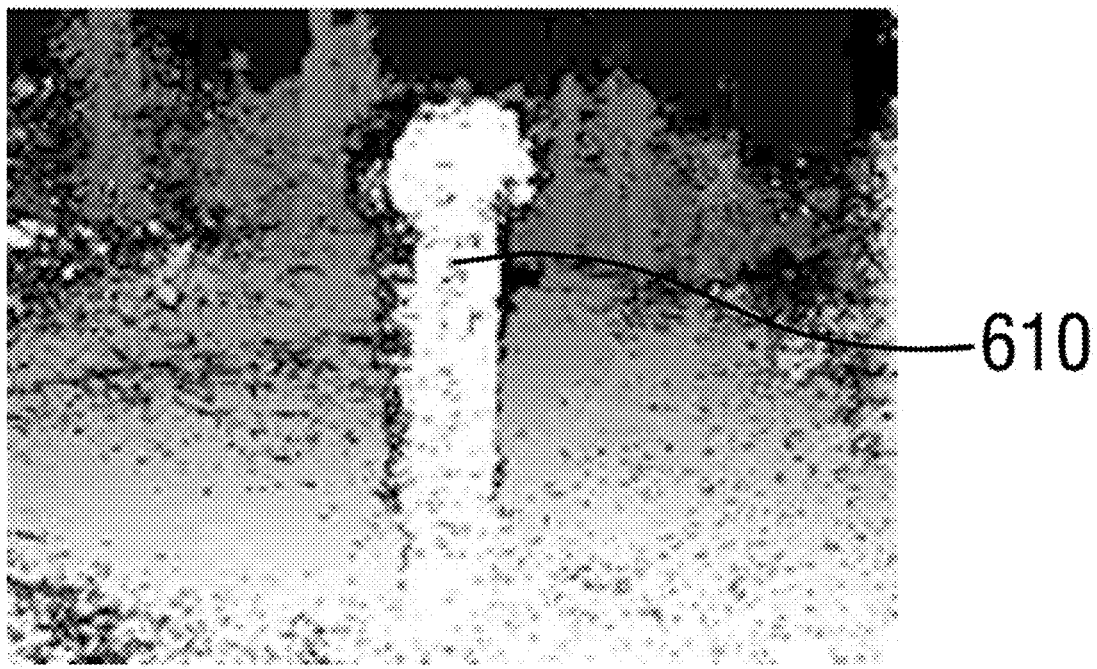

After correcting the first image and the second image to match the first image to the second image, the stereo camera 100 may extract the depth map using the first image and the second image (S260). A stereo matching method may be used to extract the depth map. As noted above, corresponding points in the first and second images may be detected and an amount of movement of the corresponding points may be calculated. If the amount of movement of a point is obtained, the depth map may be extracted based on the obtained amount of movement. FIG. 6C shows an example depth map extracted using the stereo matching method. In the depth map of FIG. 6C, a brighter portion is a portion that is closer to the camera (i.e. a portion having a small depth value), and a darker portion is a portion that is farther from the camera (i.e. a portion having a large depth value).

Figure 6D:

Once the depth map is extracted, the stereo camera may perform up-sampling of the depth map to a resolution that is substantially equal to the resolution of the high-resolution image (S270). This is to perform the out-focus using the first image having the high resolution. For example, the stereo camera performs twice up-sampling of the depth map of 5 megapixels as shown in FIG. 6C to the resolution of the depth map of 10 megapixels as illustrated in FIG. 6D. This is to make the resolution of the depth map as shown in FIG. 6C coincide with the resolution of the depth map as shown in FIG. 6D. As an example, the depth map of the portion 610 appears dark even though the portion 610 is in a short distance. In this case, an image correction may be performed with respect to the portion 610 where an error has occurred. A joint bilateral filter method may be used to obtain up-sampled depth map information as shown in FIG. 6D, or other error correction methods may be used.

Figure 6E:

After up-sampling the extracted depth map, the stereo camera 100 may perform blurring of a region of the first image using the up-sampled depth map (S280). Here, the blurred region may be a pixel region for which the depth information is equal to or greater than a reference pixel or pixel region among pixels that include the extracted depth information. A blurring method using a convolution filter or other technique may be used. FIG. 6E shows an image in which the out-focus effect is expressed through performing the blurring of the predetermined region. The first image, including the blurred region, may be output to the display unit 140 (S290).

In an embodiment of the invention, if the magnifications of the first image and the second image are different from each other (S220-N), the stereo camera 100 may crop the image acquired by the low-magnification optical zoom to extract the depth map using the stereo matching method (S230). As shown in FIGS. 5A and 5B, the stereo camera 100 may crop the same region 525 as the image acquired by the high-magnification optical zoom from the image acquired by the low-magnification optical zoom. The first image and the second image therefore may become the images of the same object with different resolutions. An out-focusing process may be performed in the same manner as the steps S240 to S290 as described above.

The first image has the resolution of 10 megapixels and the second image has the resolution of 5 megapixels, in this example for convenience in explanation. Embodiments of the invention may use any images having different resolutions. Also, while a blurring method using a convolution filter is presented, this is an example for convenience in explanation.

Any blurring method can be adopted in addition to or in place of the blurring method using a convolution filter.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. A method for performing out-focus of a camera having a first lens and a second lens, comprising:
photographing a first image with the first lens and photographing a second image with the second lens of the same scene;
extracting depth information of the photographed first image and second image using the photographed first image and second image; and
performing out-focus on the first image or the second image using the extracted depth information,
wherein the first image is an image having a higher resolution than a resolution of the second image or the first image has a higher optical magnification than an optical magnification of the second image, and
wherein extracting depth information comprises down-sampling the first image to the resolution of the second image when the first image is an image having the higher resolution than the resolution of the second image, the first down-sampled image is corrected to match the first down-sampled image to the second image, and the depth information is extracted from the first corrected image and the second image, and wherein extracting depth information comprises cropping a portion of the second image in order to make an image region acquired in the second image coincide with an image region acquired in the first image.

2. The method as claimed in claim 1, wherein the depth information includes depth information on respective pixels of the first image and the second image.

3. The method as claimed in claim 1, wherein extracting depth information further comprises up-sampling the extracted depth information.

4. The method as claimed in claim 1, wherein the first image has the higher optical magnification than an optical magnification of the second image.

5. The method as claimed in claim 1, wherein the out-focus is performed using a convolution filter.

6. The method as claimed in claim 1, wherein the camera is a digital still camera or a phone camera.

7. The method as claimed in claim 1, wherein the out-focus is performed by setting a reference among pixels, the reference including the extracted depth information, and blurring pixels for which the depth information is equal to or greater than the depth information of the reference.

8. A camera comprising:
a first lens unit;
a second lens unit;
a first image sensor unit operable to acquire a first image through the first lens unit;
a second image sensor unit configured to acquire a second image of the same scene through the second lens unit;
an image processing unit configured to extract depth information of the acquired first image and second image using the acquired first image and second image; and a control unit configured to perform out-focus with respect to the first image or the second image using the extracted depth image.

wherein the first image is an image having a higher resolution than a resolution of the second image or the first image has a higher optical magnification than an optical magnification of the second image, wherein the image processing unit is configured to perform down-sampling of the first image to the resolution of the second image when the first image is an image having the higher resolution than the resolution of the second image, correct the first down-sampled image to match the first down-sampled image to the second image, and extract depth information from the first corrected image and the second image, and wherein extracting depth information comprises cropping a portion of the second image in order to make an image region acquired in the second image coincide with an image region acquired in the first image.

9. The camera as claimed in claim 8, wherein the depth information includes depth information on respective pixels of the first image and the second image.

10. The camera as claimed in claim 8, wherein the image processing unit is operable to process the extracted depth map by up-sampling the extracted depth information.

11. The camera as claimed in claim 8, wherein the first image has the higher magnification than the optical magnification of the second image.

12. The camera as claimed in claim 8, wherein the camera is operable to perform the out-focus using a convolution filter.

13. The camera as claimed in claim 8, wherein the camera is a digital still camera or a phone camera.

14. The camera as claimed in claim 9, wherein the control unit is configured to perform the out-focus by controlling the image processing unit to set a reference among pixels, the reference including the extracted depth information, and blur pixels for which the depth information is equal to or greater than the depth information of the reference.

* * * * *